United States Patent Office 2,943,972
Patented July 5, 1960

2,943,972

METHOD OF TREATING PLANTS EMPLOYING DITHIOCARBAMATES

Gerrit Johann Meine van der Kerk, Utrecht, Netherlands, assignor, by mesne assignments, to North American Philips Company, Inc., New York, N.Y., a corporation of Delaware No Drawing. Filed Mar. 14, 1956, Ser. No. 571,379

Claims priority, application Netherlands Mar. 30, 1955

15 Claims. (Cl. 167—22)

It is known that compounds of the general formula:

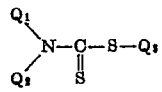

wherein $Q_1$, $Q_2$ and $Q_3$ designate an alkyl-, aryl- or aralkyl-group, which may be substituted and $Q_1$ or $Q_2$ may also designate hydrogen, are particularly suitable for combating nematoda in the soil.

It is furthermore known that compounds of the general formula:

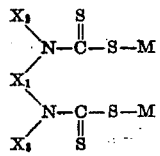

may be used for combating fungi living on plants.

In this formula $X_1$ designates a bivalent hydrocarbon group or a bivalent aliphatic chain containing more than 3 carbon atoms and divided by at least one nitrogen atom into alkylene groups consisting each of at least two carbon atoms. $X_2$ and $X_3$ may designate hydrogen, but also bivalent hydrocarbon groups, i.e. when $X_2$ and $X_3$ form a heterocyclic ring with the bond N—$X_1$—N. N designates a salt forming group or a metal atom.

In combating micro-organisms living on plants the combating means are applied to the external parts of the plant in a finely divided state. Care is taken that by adding distribution agents and adhesives an optimum part of the external surface of the plant is covered homogeneously and for a long time with the substance. The effect of such combating means is based on a directly toxical action on one or more stages of development of the micro-organisms. Consequently, these agents have only a prophylactic effect. It is a disadvantage that particular physiological leaf functions are disturbed to a greater or smaller extent and, moreover, that the parts of the plant grown subsequent to the treatment are, in fact, unprotected. Moreover, the duration of the protective action depends rather intimately upon the weather conditions. It is no exception that the protective means is washed off the leaves in rainy weather. A disadvantage of a fundamental nature is that the combating agents are less effective and may, sometimes, even fail completely, if attempts are made to combat the micro-organisms after they have penetrated into the plant.

Therefore, endeavours have been made to find means which are absorbed by the plant, irrespective of the manner in which they are brought into contact with the plant, these being conveyed to all parts of the plant by means of the physiological transport system. By such systemic means, in principle, not only those plant diseases could be combated, for which hitherto the aforesaid prophylactic means have been used, but also those diseases with which the infecting micro-organism has already penetrated into the plant.

It has now been found that by introducing particular substituents into dithiocarbaminates or bis-dithiocarbaminates compounds are obtained, which are readily absorbed by the plant in which they are transported, these substances exhibiting a pronounced systemic action on plant diseases produced by micro-organisms, more particularly by fungi. This statement is the more surprising, since the directly toxic action of these systemic compounds on micro-organisms is fairly slight. It has furthermore been found that certain compounds have, in addition, a stimulating effect upon the growth.

The invention relates to dithiocarbaminates and/or bis-dithiocarbaminates of the general formula:

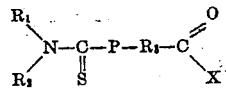

or

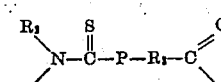

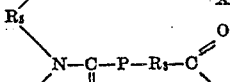

in which formula $R_1$ and $R_2$ designate hydrogen atoms and/or alkyl-groups or constitute, with the nitrogen atom, a ring of 6 atoms at the most, $R_3$ designates a bivalent, if desired, substituted alkylene-, aralykylene- or arylene group, $R_5$ designates a bivalent alkylene-, aralkylene- or arylene-group or, together with two nitrogen atoms and the two groups $R_2$, forms a ring of not more than 6 atoms, or, together with one nitrogen atom and the group $R_2$, attached to this atom, a ring of not more than 6 atoms, X designates an $NH_2$ or substituted $NH_2$-group, or an OH-group or an OH-group, in which the hydrogen atom is replaced by a cation, an alkyl, an aralkyl- or aryl-group and finally P designates an oxygen atom or a sulphur atom.

Of the compounds of the aforesaid general formulae particularly those have a satisfactorily systemic effect, in which $R_1$, $R_2$ designate an alkyl residue with less than 4 carbon atoms, preferably a methyl group.

The group $R_3$ designates preferably a lower aliphatic hydrocarbon rest with less than 5 C-atoms, more particularly, methylene, ethylene or isopropylene group.

The invention relates, more particularly, to compounds of the general formula:

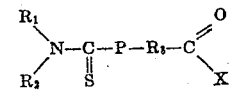

wherein the groups $R_1$, $R_2$ either one of them designates a hydrogen atom and the other an alkyl-group with three carbon atoms or both groups $R_1$, $R_2$ designate alkyl-groups with three carbon atoms. The groups P, R₃ and X designate the same as stated above.

According to a further selection of the compounds according to the invention, corresponding to the general formula indicated in the preceding paragraph, the group R₃ contains two or more carbon atoms.

This group indicates for example an ethylene-, propylene- or butylene-group. The other groups (R₁, R₂, P, X) of these compounds designate the same as stated in the definition of the compounds according to the invention.

Particularly important are, furthermore, compounds of the general formula indicated in the former two paragraphs, wherein R₁, R₂ designate and/or a lower aliphatic hydrocarbon residue with less than 4 carbon atoms, for example a methyl-, ethyl-, isopropyl-group, P designates a sulphur atom, R₃ a bivalent, aliphatic hydrocarbon residue with two or three carbon atoms and X an OH-group or an OH-group, of which the hydrogen atom is replaced by a lower alkyl-group with less than 6 carbon atoms, for example, a methyl-, ethyl-group.

The selection referred to in the preceding paragraph also applies to compounds of the general formula:

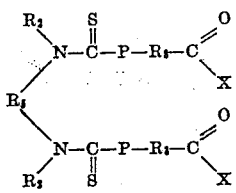

wherein R₃ and R₅ designate alkylene-groups with less than 4 carbon atoms, for example, methylene, ethylene, propylene.

The compounds according to the invention may be produced in various ways. A very suitable method of producing these compounds, in which P designates a sulphur atom is that in which a compound of the formula:

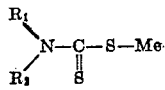

or

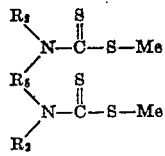

is caused to react with a compound of the formula:

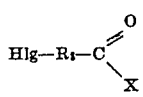

during which reaction MeHlg is produced. The compounds:

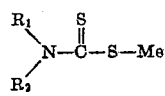

or

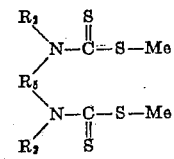

can be produced by causing carbon disulphide to react with a secondary or primary amine or by causing carbon disulphide to react with a diamine in alkaline conditions. In these formulae R₁, R₂, R₃, R₅ and X have the aforesaid meanings. Furthermore Me designates a metal atom, preferably an alkali metal and Hlg designates a halogen atom, preferably a chlorine atom.

For producing the compounds according to the invention, in which P designates an oxygen atom, the starting material is preferably constituted by xanthogenates of the general formula:

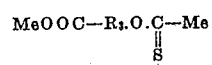

which compound is caused to react with a halogeno acid amide of the formula:

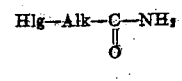

so that a substance of the formula:

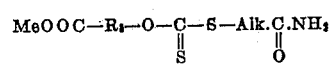

is produced. By causing this compound to react with an amine of the formula:

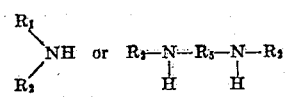

the group

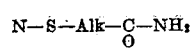

(the corresponding thioalkanecarboxy icacid amide being formed) is separated out and the compounds according to the invention are produced. In these formulae R₁, R₂, R₃ and R₅ have the meanings indicated in the description of the invention: Alk designates an alkylene group, Me designates a cation, preferably an alkali ion, for example a Na- or K-ion.

The invention furthermore relates to methods of producing combating substances containing substances according to the invention. These combating media may be produced by dissolving the compounds according to the invention or by mixing them with a liquid or solid inert diluting agent in a suitable concentration. The compounds are preferably dissolved in or mixed with a liquid, for example water. In the dissolved or suspended state the compounds according to the invention are absorbed more readily by a plant than in the case of mixing the compounds with a solid carrier.

The invention also relates to the combating of nuisible micro-organisms on plants with the aid of the compounds according to the invention or of combating media produced on the basis of these compounds. When combating these micro-organisms, for example, fungi, or bacteria, the solution or the suspension of the active components may be applied to the plant. As an alternative the substances may be added to the soil.

(A) 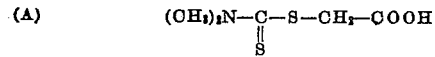

(B) 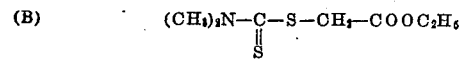

(C) 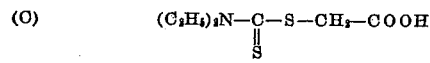

(D) 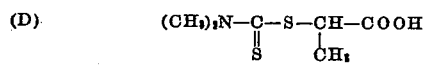

(E) 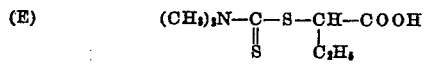

(F) 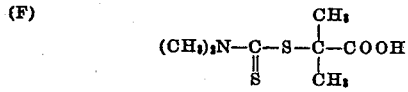

(G) 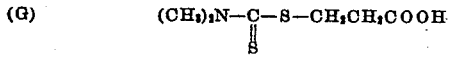

(H) 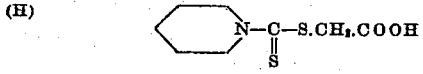

(I) 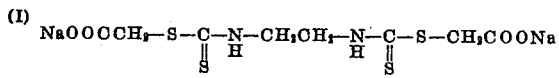

(J) 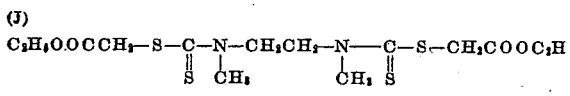

(K) 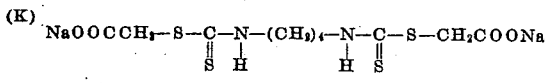

(L) 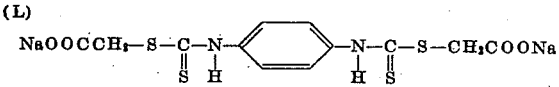

(M) 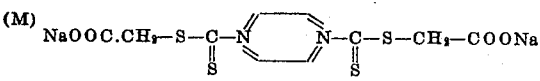

(N) 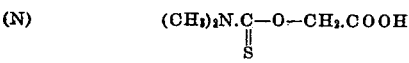

The compounds A, B, C, D, E and N appeared to have a growth-stimulating effect. From the following experiments appears the systemic action of a number of the aforesaid substances.

The compounds A, E, F, G were dissolved in water in different concentrations.

Twenty seed plants of cucumber were kept in solutions of these substances for two days, after which the plants were washed, put into water and inoculated with a suspension of conidia of *Gladosporium cucumerinum*. The results are summarized in the following table.

RESULTS AFTER 5 DAYS

| The degree of affection | | 0 | 1 | 2 | 3 | 4 | 5 | 6 |
|---|---|---|---|---|---|---|---|---|
| Compound | Concentration in g./L. | | | | | | | |
| A | 0.10 | 0 | 3 | 7 | 2 | 1 | 4 | 4 |
| E | 1.00 | 0 | 0 | 0 | 0 | 1 | 0 | 19 |
| E | 0.50 | 0 | 0 | 1 | 1 | 5 | 5 | 8 |
| E | 0.10 | 0 | 0 | 0 | 5 | 2 | 8 | 5 |
| E | 0.05 | 0 | 0 | 0 | 1 | 1 | 4 | 14 |
| F | 1.00 | 0 | 0 | 0 | 0 | 0 | 0 | 20 |
| F | 0.50 | 0 | 0 | 0 | 0 | 0 | 2 | 18 |
| F | 0.10 | 0 | 1 | 3 | 4 | 3 | 6 | 3 |
| F | 0.05 | 0 | 0 | 2 | 0 | 0 | 7 | 11 |
| G | 0.50 | 0 | 3 | 4 | 0 | 1 | 0 | 12 |
| G | 0.10 | 0 | 2 | 2 | 5 | 3 | 3 | 5 |
| G | 0.05 | 0 | 0 | 1 | 4 | 3 | 8 | 4 |
| water | (control) | 0 | 0 | 0 | 0 | 0 | 0 | 20 |

Degrees of affection: 0=no symptoms; 1=not more than three stains per cotyledon; 2=many small stains per cotyledon, or dark decolouring of the ribs; 3=cotyledons are still turgescent with more than three stains of more than 2 mms. in cross section; 4=withered, but little affected; 5=as 4 with fungal stains; 6=completely rotten or withered, mostly with a thick cover of conidia.

With a further experiment cucumbers having two-full-grown leaves were exposed in different ways to the action of a compound according to the invention. Thus 20 plants were wetted at three consecutive days with 15 ccms. of water. The soil of 20 further cucumber plants were wetted by 15 ccms. of a solution of the compound A in a concentration of 0.75 g/litre at the same three days: at the third day the two batches were inoculated with a suspension of conidia *Gladosporium cucumerinum* by spraying the plants. The result of the tests after 6 days is summarized in the following table.

RESULTS AFTER 6 DAYS

| Degree of affection | 0 | 1 | 2 | 3 | 4 | 5 | 6 |
|---|---|---|---|---|---|---|---|
| Number of plants | 0 | 3 | 15 | 0 | 2 | 0 | 0 |
| Checks | 0 | 0 | 0 | 2 | 18 | 0 | 0 |

The numerals indicating the degree of the disease have the following meanings: 0=no symptoms of the disease; 1=top or one leaf affected; 2=one leaf stem slack or one leaf mouldy; 3=two leaf stems slack or one stem and one leaf mouldy; 4=two leaf stems slack and one leaf mouldy; 5=two leaf stems slack and two leaves mouldy; 6=more serious affection.

With a third experiment about three weeks old cucumber plants were used. With eight specimen the soil of the pot was wetted at three consecutive days with 15 ccms. of a solution of the compound A in a concentration of 1 g./litre. With 8 specimen the plants were sprayed at three consecutive days with the same solution. A third series consisted of 8 cucumber plants, which were not treated. After these three days all plants were inoculated with *Gladosporium cucumerinum* by spraying a suspension of the conidia of this fungus over the plants.

Ten days after the beginning of the tests the results were checked: it was found that 7 plants of the first series had at some areas a thin, brown, dry dash, i.e. where the fungus had penetrated into the plant, but had died at that area. One plant had a dried top. Three plants of the second series were not affected, the five other plants, however, were seriously affected.

Of all plants of the third series the tops and the stems down to the area where the full-grown leaves sprout were completely rotten and covered with a thick layer of conidia of Gladosporium.

Whereas it appears from the aforesaid tests that the compounds according to the invention have a systemic action, the data hereinafter prove that there is substantially no directly fungicidal action of the compounds according to the invention.

| Formula | Botrytis allii | Penicillium italicum | Aspergillus niger | Rhizopus nigricans |
|---|---|---|---|---|
| $(CH_3)_2N-\underset{\underset{S}{\|}}{C}-SCH_2COOH$ | 100 | 100 | >200 | >200 |
| $(CH_3)_2N-\underset{\underset{S}{\|}}{C}-\underset{\underset{CH_3}{\|}}{\overset{\overset{CH_3}{\|}}{C}}-COOH$ | 100 | >100 | >100 | >100 |
| $NaOOCCH_2S-\underset{\underset{S}{\|}}{C}-\underset{\underset{H}{\|}}{N}CH_2CH_2\underset{\underset{H}{\|}}{N}-\underset{\underset{S}{\|}}{C}-SCH_2COONa$ | 200 | 200 | >500 | >500 |

This table may be explained as follows. The left-hand column contains the formula of the tested compound. By means of the so-called roll culture method, described by van Leeuwenhoek in J. Microbiology and Serology, 16, 282 (1950), the limit concentration of these compounds was determined, at which the growth of four fungi on a nutrient glucose agar medium (pH=6.5) can be prevented. The fungal cultures employed were two days old with all tests. The names of the fungi, as well as the limit concentrations found in mg./litre are indicated in the further four columns. The mark > indicates that the limit concentrations exceeded the numeral indicated after this mark. These limit concentrations are fairly high.

In the following embodiments methods of producing compounds according the invention are described.

*Example 1.—S-(carboxymethyl) - N,N - dimethyl-dithiocarbaminate*

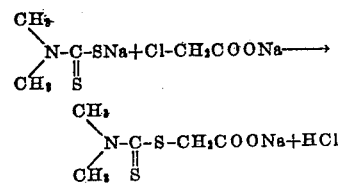

A solution of 9.5 gs. of monochloro acetic acid and 6.5 gs. of $Na_2CO_3 \cdot H_2O$ in 20 ccms. of water was dripped, whilst cooled and stirred, into a solution of 18.8 gs. of sodium-dimethyl-dithiocarbaminate in 30 ccms. of water. Then the mixture was stirred for two hours in addition, after which the clear solution was acidified with 4 N HCl to a pH of about 2. To the thick, white suspension was added 30 ccms. of water. The precipitate was filtered off and washed with water, then recrystallized from water. The yield of S-(carboxymethyl)-N, N-dimethyl-dithiocarbaminate, calculated on monochloro acetic acid, was 81%. Melting point 145° C. (uncorrected).

*Example 2.—S-(1 - carboxypropyl-1) - N,N - dimethyl-dithiocarbaminate*

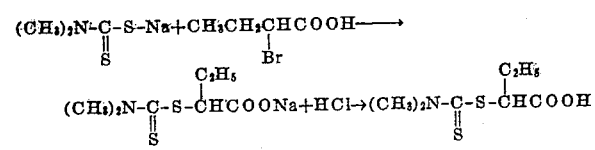

Whilst stirring, a solution of 25 gs. of α-bromo-butyric acid and 13.5 gs. of $Na_2CO_3.H_2O$ in 90 ccms. was dripped into a solution of 28.2 gs. of sodium dimethyl-dithiocarbaminate in 90 ccms. of water. The temperature increased to 28° C. Stirring was continued at 33° C. for two hours. The turbid reaction mixture was filtered and the filtrate was acidified with 6N HCl to a pH of about 2. The precipitate was filtered off and recrystallized from ethanol. The yield of S-(1-carboxy-propyl-1)-N, N-dimethyl-dithiocarbaminate, calculated on α-bromobutyric acid, was 81%. Melting point 105 to 106° C. (uncorrected).

*Example 3.—S-(carbaethoxymethyl)-N,N-dimethyl-dithiocarbaminate*

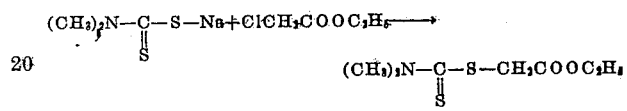

A solution of 12.2 gs. of monochloro acetic acid ethyl ester in 10 ccms. of 96% ethanol was dripped, whilst stirring into a solution of 18.8 gs. of sodium-dimethyl-dithiocarbaminate in 100 ccms. of 96% ethanol. The temperature increased to 32° C. Then stirring was continued for three hours at room temperature. The crystalline precipitate produced was filtered off and washed with water: the yield was 9 gs. From the ethanolic mother liquor further 9 gs. were obtained by evaporation. This product was recrystallized from methanol. The total yield of S-(carbaethoxymethyl)-N,N-dimethyl-dithiocarbaminate, calculated on monochloro acetic acid ethyl ester, was 80%. Melting point 62 to 63° C.

*Example 4.—S-(2-carbaethoxypropyl-2)-N,N-dimethyl-dithiocarbaminate*

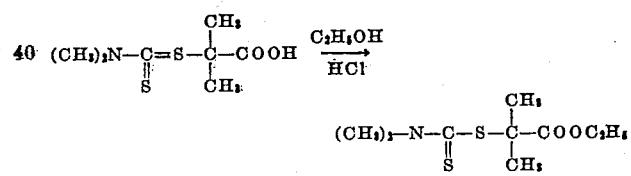

4 gs. of S-(2-carboxypropyl-2)-N,N-dimethyl-dithiocarbaminate were refluxed with about 75 ccms. of a 5% solution of HCl in 96% ethanol for one and a half hours. 50 ccms. of the reaction mixture (mainly ethanol) was distilled off. The distillation residue was neutralized with a soda solution after 80 ccms. of water had been added to the residue. The residue thus treated was extracted by means of diethyl ether, after which the extract was dried on sodium sulphate. After the diethyl-ether had been evaporated, the residue was subjected to high-vacuum distillation. The main fraction changed over at 141 to 142° C. (uncorrected) and a pressure of 0.5 mm. Hg. The product crystallized and had a melting point of 36 to 38° C. (uncorrected). The yield of S-(2-carbaethoxypropyl-2)-N,N-dimethyl-dithiocarbaminate, calculated on the dithiocarbaminate, was 60.8%.

*Example 5.—S-(carboxymethyl)-cyclopentamethylene-dithiocarbaminate*

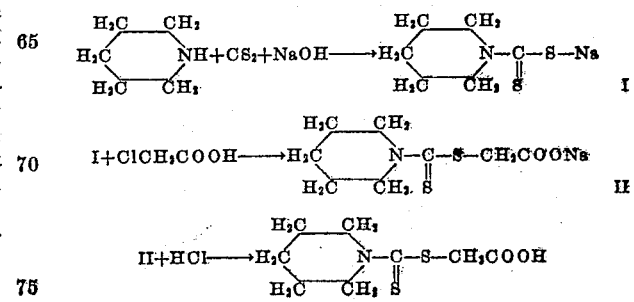

To a solution of 10 ccms. of piperidine in 50 ccms. of water was added, whilst stirring and cooling, a solution of 6.4 ccms. of $CS_2$ and then a solution of 4 gs. of NaOH in 50 ccms. of water in drops. After one hour a soda-neutralized, aqueous solution of 9.5 gs. of monochloro acetic acid was dripped into this mixture, after which stirring was continued for one and a half hours. The reaction mixture was filtered and then acidified by means of 4 n hydrochloric acid to a pH value of 2. The precipitate produced was filtered off and recrystallized from benzene. The yield of S-(carboxymethyl)-cyclopentamethylene dithiocarbaminate, calculated on piperidine, was 73%. The melting point of the compound obtained was 144 to 147° C.

*Example 6.—Di-sodium-S,S'-bis(carboxymethyl)-ethylene bis-dithiocarbaminate*

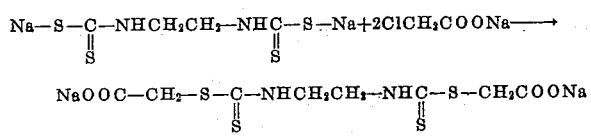

To a solution of 25 gs. of di-sodium-ethylene bis-dithiocarbaminate (obtained by causing ethylene diamine to react with carbon disulphide) in 200 ccms. of water was added a solution of 19 gs. of monochloro acetic acid, neutralized with soda. After being kept at room temperature for one night, the reaction mixture was acidified, whilst cooled with ice, by means of 0.02 N hydrochloric acid. The precipitate was filtered off rapidly and dissolved in 0.5 N NaOH. The liquid was filtered and the filtrate was evaporated to dryness. The residue was again purified by dissolving it in water and precipitating it with ethanol and acetone. The yield of di-sodium-S,S' - bis - (carboxymethyl) - ethylene bis-dithiocarbaminate, calculated on the bis-dithiocarbaminate, was 22%. The substance had no melting point and decomposed upon heating.

*Example 7.—N,N-dimethyl thiocarbamyl glycolic acid*

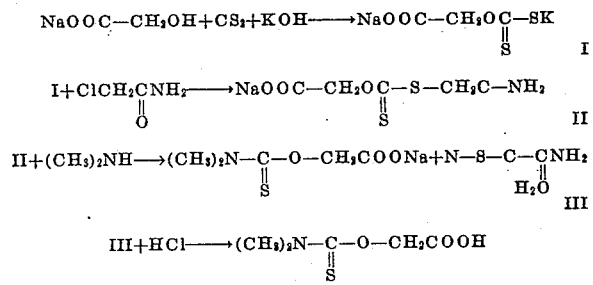

A solution of 27 gs. of sodium carbonate 1 aq. and 24 gs. of monochloro acetic acid was refluxed for four hours. Subsequent to cooling 17.5 gs. of KOH and 15.4 ccms. of $CS_2$ was added to the reaction mixture and this mixture was shaken for 24 hours. The reaction mixture was evaporated in vacuum to remove $CS_2$, after which 23.4 gs. of chloroacetamid was added thereto. The chloroacetamid was dissolved whilst heat was produced. After 6 hours the light-green solution was acidified with 65%-aqueous $H_2SO_4$. During a stay in a refrigerator a yellow, crystalline precipitate was formed. The yield was 60%, calculated on monochloro acetic acid. Melting point 140 to 142° C. (uncorrected).

21 gs. of this coupling product (II) was dissolved in 54 gs. of 25.4% dimethylamine and after 24 hours it was brought to a pH-value of 2 by addition of 4 N hydrochloric acid. The reaction mixture was extracted three times by means of diethylether. Subsequent to drying on sodiumsulfate, the etheric solution was evaporated to dryness and the residue was recrystallized from water. The yield was 80%. Melting point 116.5 to 117.5° C. (uncorrected).

*Example 8.—S-(2-carbamoylpropyl-2)-N,N-dimethyl-dithiocarbaminate*

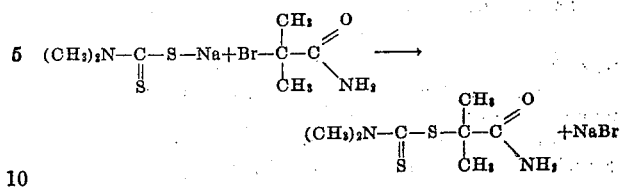

To a solution of 9.4 gs. of sodium dimethyl-dithiocarbaminate in 30 ccms. of ethylalcohol (100%), heated on a water bath to 80° C., was added, whilst stirring a hot solution of 8.3 gs. of α-bromo-isobutyric acid amide. After stirring it for 4.5 hours at 80° C., the sodium bromide formed was filtered off and the solution was evaporated to dryness in vacuum. The syrup like product was purified by recrystallisation from acetone. Melting point 119.5 to 121.5° C. (uncorrected). The yield was 48%.

What is claimed is:

1. A method of treating plants to prevent injury to the plants by fungi comprising applying to the absorptive structure of said plants a composition containing a com- corresponding to the general formula

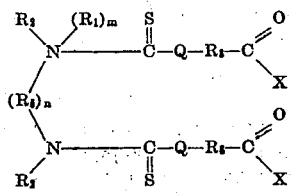

wherein $R_1$ and $R_2$ are each selected from the group consisting of hydrogen atoms, alkyl radicals containing less than 4 carbon atoms and together with the nitrogen atoms to which they are attached to heterocyclic ring containing not more than 6 atoms, $R_3$ is selected from the group consisting of bivalent alkylene radicals containing less than 5 carbon atoms $R_5$ is selected from the group consisting of bivalent alkylene radicals containing less than 6 carbons atoms, together with both $R_2$ radicals and both nitrogen atoms a heterocyclic ring containing not more than 6 atoms and together with one of the nitrogen atoms and the $R_2$ radical attached to this nitrogen atom and heterocyclic ring containing not more than 6 atoms, X is selected from the group consisting of $NH_2$, OH, OMe wherein Me is an alkali metal ion OAlk wherein Alk is an alkyl radical containing less than 6 carbon atoms, Q is selected from the group consisting of oxygen and sulfur atoms and $n$ and $m$ are each small whole numbers selected from the group consisting of zero and one and wherein the sum of the values of $n$ and $m$ equal one, whereby said composition is absorbed by said plants.

2. A method of treating plants to prevent injury to the plants by fungi comprising applying to the absorptive structure of said plants a composition containing a compound coresponding to the formula

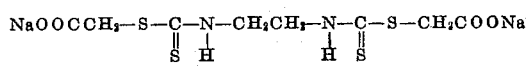

whereby said composition is absorbed by said plants.

3. A method of treating plants to prevent injury to the plants by fungi comprising applying to the absorptive structure of said plants a composition containing a compound corresponding to the formula

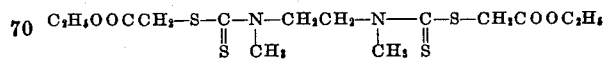

whereby said composition is absorbed by said plants.

4. A method of treating plants to prevent injury to the plants by fungi comprising applying to the absorptive structure of said plants a composition containing a compound corresponding to the formula

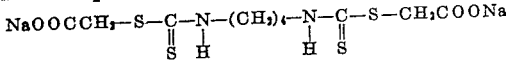

whereby said composition is absorbed by said plants.

5. A method of treating plants to prevent injury to the plants by fungi comprising applying to the absorptive structure of said plants a composition containing a compound corresponding to the formula

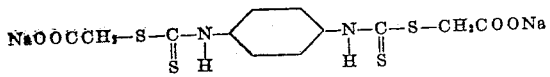

whereby said composition is absorbed by said plants.

6. A method of treating plants to prevent injury to the plants by fungi comprising applying to the absorptive structure of said plants a composition containing a compound corresponding to the formula

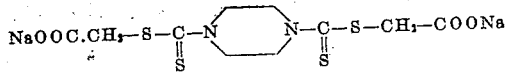

whereby said composition is absorbed by said plants.

7. A method of treating plants to prevent injury to the plants by fungi comprising applying to the absorptive structure of said plants a composition containing a compound corresponding to the formula

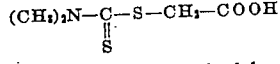

whereby said composition is absorbed by said plants.

8. A method of treating plants to prevent injury to the plants by fungi comprising applying to the absorptive structure of said plants a composition containing a compound corresponding to the formula

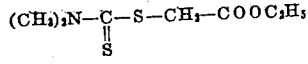

whereby said composition is absorbed by said plants.

9. A method of treating plants to prevent injury to the plants by fungi comprising applying to the absorptive structure of said plants a composition containing a compound corresponding to the formula

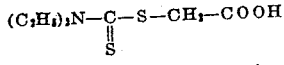

whereby said composition is absorbed by said plants.

10. A method of treating plants to prevent injury to the plants by fungi comprising applying to the absorptive structure of said plants a composition containing a compound corresponding to the formula

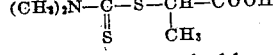

whereby said composition is absorbed by said plants.

11. A method of treating plants to prevent injury to the plants by fungi comprising applying to the absorptive structure of said plants a composition containing a compound corresponding to the formula

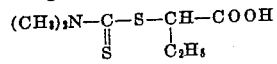

whereby said composition is absorbed by said plants.

12. A method of treating plants to prevent injury to the plants by fungi comprising applying to the absorptive structure of said plants a composition containing a compound corresponding to the formula

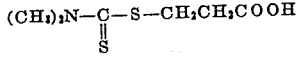

whereby said composition is absorbed by said plants.

13. A method of treating plants to prevent injury to the plants by fungi comprising applying to the absorptive structure of said plants a composition containing a compound corresponding to the formula

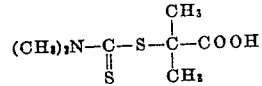

whereby said composition is absorbed by said plants.

14. A method of treating plants to prevent injury to the plants by fungi comprising applying to the absorptive structure of said plants a composition containing a compound corresponding to the formula

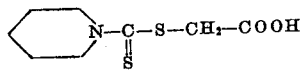

whereby said composition is absorbed by said plants.

15. A method of treating plants to prevent injury to the plants by fungi comprising applying to the absorptive structure of said plants a composition containing a compound corresponding to the formula

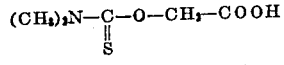

whereby said composition is absorbed by said plants.

References Cited in the file of this patent

UNITED STATES PATENTS

| | | |
|---|---|---|
| 1,939,692 | Hardman | Dec. 19, 1933 |
| 2,085,401 | Twiss et al. | June 29, 1937 |
| 2,175,809 | Lichty | Oct. 10, 1939 |
| 2,188,280 | Lichty | Jan. 23, 1940 |
| 2,474,839 | Gresham et al. | July 5, 1949 |
| 2,600,624 | Zoppa | June 17, 1952 |
| 2,796,376 | Williams et al. | June 18, 1957 |
| 2,835,625 | Chien Pen Lo | May 20, 1958 |
| 2,841,519 | Chien Pen Lo | July 1, 1958 |
| 2,842,475 | Craig | July 8, 1958 |

UNITED STATES PATENT OFFICE

CERTIFICATE OF CORRECTION

Patent No. 2,943,972            July 5, 1960

Gerrit Johann Meine van der Kerk

It is hereby certified that error appears in the printed specification of the above numbered patent requiring correction and that the said Letters Patent should read as corrected below.

Column 10, line 24, for "com-" read -- compound --.

Signed and sealed this 27th day of December 1960.

(SEAL)
est:

H. AXLINE
⹁g Officer

ROBERT C. WATSON
Commissioner of Patents